(No Model.)
J. MORTON.
WATER WHEEL GOVERNOR.
No. 385,280. Patented June 26, 1888.
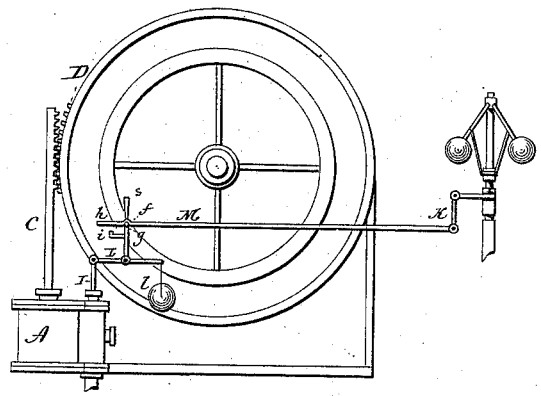
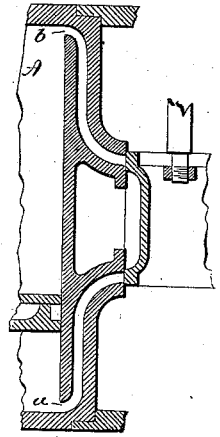
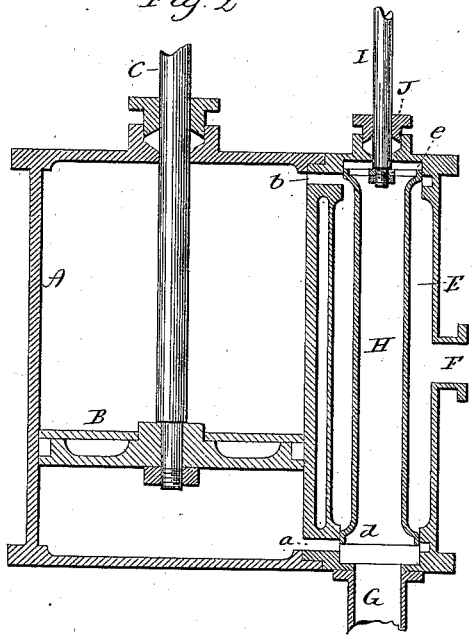
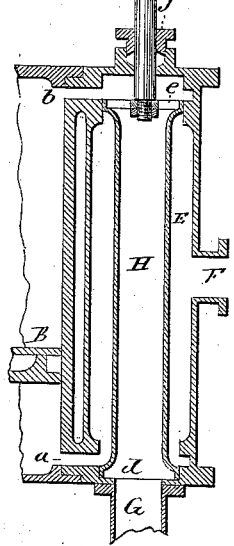
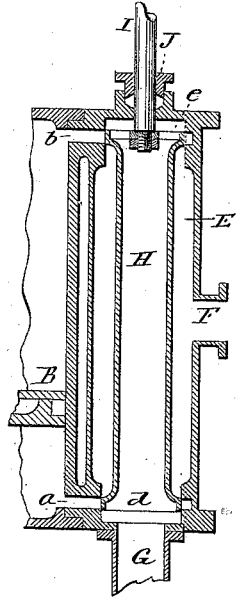
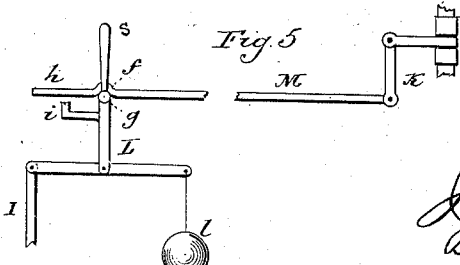
Witnesses
J. H. Shumway
Fred C. Earl
James Morton, Inventor
By Atty. John R. Earl

UNITED STATES PATENT OFFICE.

JAMES MORTON, OF QUIDNICK, RHODE ISLAND.

WATER-WHEEL GOVERNOR.

SPECIFICATION forming part of Letters Patent No. 385,280, dated June 26, 1888.

Application filed October 31, 1887. Serial No. 253,819. (No model.)

*To all whom it may concern:*

Be it known that I, JAMES MORTON, of Quidnick, in the county of Kent and State of Rhode Island, have invented a new Improvement in Water-Wheel Governors; and I do hereby declare the following, when taken in connection with accompanying drawings and the letters of reference marked thereon, to be a full, clear, and exact description of the same, and which said drawings constitute part of this specification, and represent, in—

Figure 1, an end view of a water-wheel, showing this invention applied thereto; Figs. 2, 3, and 4, vertical sections through the cylinder, valve-chamber, and valve, enlarged, illustrating different positions of the valve; Fig. 5, a detached view, enlarged, of the detachable connection between the valve and governor; Fig. 6, a modification.

This invention relates to an apparatus to regulate the flow of water upon a water-wheel, having for its object to cause a quick action upon the flow of water, to increase or diminish it, as occasion may require, to produce a uniform speed of the wheel, and to completely cut off the flow in case of accident, like the breaking of belts or shafting, whereby more or less of the machinery being driven by the wheel is suddenly disconnected, and which disconnection would cause the wheel to greatly increase its speed, commonly called "racing," and beyond the control of many of the governors now in use.

The invention consists in the combination of mechanism as hereinafter described, and particularly recited in the claim.

A represents the regulating-cylinder; B, its piston, and C the piston-rod, not unlike the cylinder, piston, and rod of a steam-engine.
The cylinder is constructed with ports $a\, b$ at its respective ends for the admission or escape of the operative medium, preferably water. The piston-rod is in connection with the gate. This connection may be made in various ways;
but it will be sufficient for the clear understanding of the invention to illustrate a single means, and this is done in Fig. 1, in which a well-known wheel is represented.

D indicates the segment-gear on the gate as a means for imparting a rotary opening or closing movement to the gate. On the piston-rod C is a toothed rack, which, under the arrangement of the cylinder shown, works directly into the segment D. If under this arrangement the piston C rises or falls, it will impart a corresponding rotation to the gate, to increase or diminish the flow of water, as the case may be, and to any extent, from wide open to fully closed.

E represents the valve-chamber, which, by preference, is in the form of a cylinder parallel with the cylinder A, and which communicates therewith through the ports $a\, b$, as indicated in Fig. 2. The valve-chamber is provided with an inlet-passage, F, and with an outlet-passage, G, the latter being at the lower end of the chamber.

The valve H is in the form of a hollow or tubular cylinder open at both ends. At the port ends of the valve-chamber the inner surface of the chamber is cylindrical and the two ends concentric with each other. The valve terminates at each end in a cylindrical head, respectively, $d\, e$, which fit closely and work in the port ends of the valve-chamber as pistons; but there must be an opening or passage through the valves from end to end. The length of the valve between its ends is equal to the distance between the ports, plus the width of one port, and as represented in Figs. 2, 3, and 4, and the thickness of each head $d\, e$ of the valve corresponds to the width of the ports $a\, b$. Between the heads the valve is reduced so as to leave a space in the chamber around the valve.

Under this construction it will be apparent that when the valve stands as in Fig. 2 the port $a$ is open from the cylinder to the escape or exhaust G, while at the same time the port $b$ is open to the valve-chamber, so that water or other medium in the chamber under pressure will flow into the cylinder A through the port $b$ upon that side of the piston and impart a movement to the piston toward the opposite end of its cylinder. At the same time the water upon the advancing side of the piston escapes through the port $a$ to the outlet-passage G.

Now if the valve be moved to the other extreme, as seen in Fig. 3, then the port *b* will be cut off from the chamber E, but open above the tubular valve H, and the port *a* will be open to the chamber E; hence the forcing medium will flow from the valve-chamber through the port *a* into the cylinder and against that side of the piston, there applying the force to return the piston, and in this return movement of the piston the water or medium upon the then advancing side of the piston will flow out through the port *b*, thence down through the tubular valve and into the escape-passage G, which now forms a continuation of the passage through the tubular valve.

From the arrangement and movement of the valve described it will be apparent that the movement of the piston may at any time be changed by shifting the valve, or that if the valve be brought to the position indicated in Fig. 4 then the admission of force to the cylinder will be cut off and the piston remain stationary. The valve is provided with a rod, I, working through a stuffing-box, J, in the usual manner for valve-rods of steam-engines.

The governor may be either of the many known governors, which under variable speed of revolution are adapted to impart a rising and falling movement. One of the most common is represented in Fig. 1, and, as represented, connection is made between the governor and valve-rod I by two bell-crank levers, K L, the one, K, being in connection with the sliding collar of the governor, and the other, L, with the valve-rod, the two levers joined by the rod M, so that as the governor-collar rises under increasing revolution the valve-rod and valve will rise to a corresponding extent, it being understood that in the arrangement shown in the illustration the piston rises to open the gate and descends to close the gate; but this is only for convenience of illustration. Other arrangements will be made to adapt the governing-cylinder to particular gates or positions. As the governor-collar descends, the valve will be raised accordingly to admit force to raise the piston and open the gate.

The governor is adjusted in the usual manner, so that the valve H will at the normal speed be held in a position just closing the ports *a b*, as seen in Fig. 4. Therefore if the speed of the governor be increased, thereby causing the governor-collar to rise, the valve will be correspondingly raised and the port *b* be opened to the chamber E. Thereupon the medium in the said chamber under pressure will flow into the cylinder and force the piston downward and give to the gate a contracting or closing movement. At the same time the port *a* is opened for the escape from below the piston to the escape-passage G, as seen in Fig. 2.

If the speed of the governor be reduced below the normal, the valve will be depressed, so as to open the port *a* to the chamber E, and the port *b* will be opened to the escape-passage through the valve, as seen in Fig. 3. Then a reverse action will be imparted to the piston and the gate correspondingly opened.

In either of the actions of the governor just described, so soon as the speed is again brought to the normal, the valve will be brought to the position, Fig. 4, where the piston is simply held in equilibrium, and thus held the piston is very sensitive, and will act so quickly and positively upon the gate that any ordinary changes in the amount of power being used will not produce an apparent variation in the velocity of the water-wheel or machinery being driven by it.

To provide against the possibility of racing beyond the control of the governor, and as occurs by the breaking of main or principal belts, the governor is adapted to cause the piston to automatically close the gate and stop the power. This is best done by making the connection between the rod M and one of the levers K L—say L—detachable, as seen in Fig. 5, where the rod M is represented as constructed with a notch, *f*, adapted to engage the corresponding end of its arm of the lever L. The rod M is constructed with an extension, *h*, beyond said notch *f*, and the arm with which it engages is provided with a finger, *i*, standing beneath the extension *h*. Under the usual working of the water-wheel and governing apparatus the finger *i* does not reach the extension *h*; but when under extraordinary speed the governor-collar rises higher the rod M will draw the lever L so far over that the finger *i* will strike the extension *h* and raise the rod M out of engagement with said lever L. Then by means of a weight, *l*, or an equivalent therefor, the lever will be turned to its extreme position and raise the valve to open wide the port *b*, (or the gate closing port,) whereupon the force from the chamber E will be instantly applied to close the gate and stop the wheel.

The valve may be substantially like a common slide-valve of a steam-engine, as seen in Fig. 6, with the inlet and exhaust passages corresponding. I therefore do not wish to be understood as limiting my invention to the precise construction and arrangement of the valve, nor to the particular connections with the governor described, as such connections must vary according to different governors or locations.

The valve of the piston-cylinder may be utilized to mechanically open or close the gate. To do this, the lever L may be extended to form a handle, *s*, so that, the rod M being disengaged from the lever, the hand may be applied to the said lever and mechanically move the valve in either direction, accordingly as it is desired to open or close the gate.

I claim—

The combination of the gate of a water-wheel and a governor, substantially such as described, with a cylinder, a piston in said cylinder, the piston-rod in connection with said gate, a valve-chamber having ports leading therefrom to the respective ends of said cylinder, and also provided with inlet and escape passages, a valve in said chamber adapted to open and close said ports to said chamber or escape, as the case may be, a bell-crank lever, L, and a rod, M, forming connections between said governor and valve, the said rod constructed with a notch, $f$, adapted to detachably engage said lever L, said lever L constructed with a finger, $i$, adapted to disengage said rod from said lever, substantially as described.

JAMES MORTON.

Witnesses:
PETER NOLAN, Jr.,
JAMES MORTON, Jr.